(12) United States Patent
Kishiyama et al.

(10) Patent No.: US 8,520,757 B2
(45) Date of Patent: Aug. 27, 2013

(54) MOBILE COMMUNICATIONS SYSTEM, COMMUNICATIONS APPARATUS, AND COMMUNICATIONS METHOD

(75) Inventors: Yoshihisa Kishiyama, Yokosuka (JP); Teruo Kawamura, Yokosuka (JP); Nobuhiko Miki, Yokohama (JP); Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 315 days.

(21) Appl. No.: 12/999,072

(22) PCT Filed: Jun. 22, 2009

(86) PCT No.: PCT/JP2009/061345
§ 371 (c)(1),
(2), (4) Date: Mar. 15, 2011

(87) PCT Pub. No.: WO2009/157417
PCT Pub. Date: Dec. 30, 2009

(65) Prior Publication Data
US 2011/0164662 A1 Jul. 7, 2011

(30) Foreign Application Priority Data
Jun. 23, 2008 (JP) ................................. 2008-163845

(51) Int. Cl.
*H04L 5/12* (2006.01)

(52) U.S. Cl.
USPC ........................................................ 375/261

(58) Field of Classification Search
USPC .................. 375/260, 261; 370/329
See application file for complete search history.

(56) References Cited

U.S. PATENT DOCUMENTS 7,882,412 B2    2/2011    Nanda

| 2006/0107166 | A1 | 5/2006 | Nanda |
| 2011/0154144 | A1 | 6/2011 | Nanda |
| 2011/0211510 | A1* | 9/2011 | Kim et al. ........................ 370/311 |
| 2012/0099546 | A1* | 4/2012 | Cho et al. ........................ 370/329 |
| 2012/0230280 | A1* | 9/2012 | Chandra et al. ............... 370/329 |
| 2013/0003675 | A1* | 1/2013 | Han et al. ....................... 370/329 |

FOREIGN PATENT DOCUMENTS

| CN | 101073218 A | 11/2007 |
| JP | 2003-179581 A | 6/2003 |

OTHER PUBLICATIONS

International Search Report w/translation from PCT/JP2009/061345 dated Aug. 25, 2009 (3 pages).
Written Opinion from PCT/JP2009/061345 dated Aug. 25, 2009 (3 pages).
3GPP TSG RAN WG1 Meeting #53, R1-081950; "Necessity of ACK/NAK Repetition in PUCCH"; NTT DOCOMO, Inc. et al.; Kansas City, USA; May 5-9, 2008 (2 pages).

(Continued)

*Primary Examiner* — Don N Vo
(74) *Attorney, Agent, or Firm* — Osha Liang LLP

(57) ABSTRACT

A communications apparatus includes a receiving unit which receives a data channel for each predetermined transmission period; a determining unit which determines, for each data channel, acknowledgement information which indicates an acknowledgement or a non-acknowledgement; a generating unit which generates a control channel including the acknowledgement information; and a transmitting unit which transmits the control channel. For first and second data channels received during at least successive first and second transmission periods, the first and second acknowledgement information is provided. The second control channel which includes both the first and the second acknowledgement information which includes both the first and the second acknowledgement information is transmitted after a first control channel which includes the first acknowledgement information.

21 Claims, 12 Drawing Sheets

(56) References Cited

OTHER PUBLICATIONS

3GPP TSG RAN WG1 Meeting #53, R1-081794; "Necessity of the Scrambling for ACK/NACK on PUCCH"; Panasonic et al.; Kansas City, USA; May 5-9, 2008 (7 pages).
3GPP TSG RAN WG1 #53, R1-081982; "Simultaneous Transmission of the Current and the Repeated ACKNAK"; Texas Instruments; Kansas City, MO, USA; May 5-9, 2008 (3 pages).
3GPP TSG RAN WG1 Meeting #53bis, R1-082571; "Views on UL ACK/NAK Repetition Details"; NTT DOCOMO, Inc.; Warsaw, Poland; Jun. 30-Jul. 4, 2008 (5 pages).
3GPP TR 25.814 V7.0.0; "3rd Generation Partnership Project; Technical Specification Group Radio Access Network; Physical Layer Aspects for Evolved Universal Terrestrial Radio Access (UTRA) (Release 7)"; Jun. 2006 (126 pages).
3GPP TSG RAN WG Meeting #47bis, R1-070103; "Downlink L1/L2 Control Signaling Channel Structure: Coding"; NTT DOCOMO, Inc. et al.; Sorrento, Italy; Jan. 15-19, 2007 (17 pages).
Chinese Office Action for Application No. 200980128801.3, mailed on Feb. 27, 2013 (27 pages).
esp@cenet Patent Abstract for Chinese Publication No. 101073218, publication date Nov. 14, 2007 (1 page).
Patent Abstracts of Japan for Japanese Publication No. 2003-179581, publication date Jun. 27, 2003 (1 page).

* cited by examiner

PRIOR ART

MOBILE COMMUNICATIONS SYSTEM, COMMUNICATIONS APPARATUS, AND COMMUNICATIONS METHOD

BACKGROUND OF THE INVENTION

1. Field of the Invention

The present invention relates generally to the technical field of mobile communications, and specifically to mobile communications systems, communications apparatuses, and communications methods that use next-generation mobile communications techniques.

2. Description of the Related Art

In this type of technical field, mobile communications schemes to succeed so-called third generation mobile communications schemes are being studied by 3GPP, a standardization body for wideband code division multiple access (W-CDMA) schemes. More specifically, as the mobile communications schemes to succeed the W-CDMA, high-speed downlink packet access (HSDPA), high-speed uplink packet access (HSUPA) schemes, etc., not only Long term evolution (LTE) schemes, but also succeeding mobile communications schemes are being studied. Successors to an LTE system include, for example, IMT-Advanced, LTE-Advanced, and fourth-generation mobile communications systems, etc.

A downlink radio access scheme in the LTE system is orthogonal frequency division multiple access (OFDMA). For uplink, single-carrier frequency division multiple access (SC-FDMA) is used. However, a multi-carrier scheme may be used for uplink in a different system.

The OFDMA is a scheme which divides a frequency band into multiple narrow frequency bands (sub-carriers) and overlaying data onto the respective sub-carriers to transmit the overlaid data. Densely lining up the sub-carriers such that they are in an orthogonal relationship with each other on the frequency axis makes it possible to expect that high-speed transmission be achieved and frequency utilization efficiency be increased.

The SC-FDMA is a single-carrier transmission scheme which divides a frequency bandwidth for each terminal in the Fourier-transformed frequency domain and allows using mutually different frequency bands among multiple terminals. Such a scheme as described above, which makes it possible to easily and effectively reduce inter-terminal interference as well as to reduce fluctuations in transmission power, is preferable from points of view of reducing power consumption of terminals and widening the coverage, etc. The SC-FDMA scheme, which uses a DFT-spread OFDM scheme, for example, corresponds to mapping locations of a signal that are restricted to a series of contiguous frequency bands, or a signal mapped in the frequency domain to a comb-tooth shape in certain intervals. Using single-carrier FDMA in uplink is disclosed in Non-Patent document 1, for example.

In a system such as the LTE, for downlink or uplink, one or more resource blocks (RBs) or resource units (RUs) are allocated to a user apparatus to conduct communication. The resource blocks are shared by a large number of user apparatuses within a system. In the LTE, the base station apparatus determines which user apparatus of multiple user apparatuses a resource block is allocated to for each sub-frame, which is 1 ms. The sub-frame may be called a transmission time interval (TTI). Determining allocations of radio resources is called scheduling. In downlink, a base station apparatus transmits, to a user apparatus selected in the scheduling, a shared data channel in one or more resource blocks. The shared data channel is called a physical downlink shared channel (PD-SCH). In uplink, the user apparatus selected in the scheduling transmits, to the base station apparatus, a shared channel in one or more resource blocks. The shared channel is called a physical uplink shared channel (PUSCH).

In a communications system using the shared channels as described above, it is necessary, in principle, to signal, for each sub-frame, which user apparatus the shared channel is allocated to. The control channel used in the above-mentioned signaling is called a physical downlink control channel (PDCCH) or a downlink (DL)-L1/L2 control channel (PD-CCH). In addition to the PDCCH, a downlink control signal may include a physical control format indicator channel (PC-FICH) and a physical hybrid ARQ indicator channel (PH-ICH).

The PDCCH may include the following information sets, for example: (See, Non-patent document 2, for example.)

a downlink scheduling grant;
an uplink scheduling grant;
an overload indicator; and
a transmission power control command bit.

Downlink scheduling information includes, for example, information on a downlink shared channel and more specifically includes information on allocating downlink resource blocks, information on identifying user apparatuses (UE-ID), number of streams, information on pre-coding vectors, data size, modulation schemes, information on HARQ (hybrid automatic repeat request), etc.

Moreover, the uplink scheduling grant includes, for example, information on an uplink shared channel and more specifically includes information on allocating uplink resources, information on identifying user apparatuses (UE-ID), data size, modulation schemes, information on uplink transmission power, information on demodulation reference signals in uplink MIMO, etc.

The PCFICH is information for reporting a PDCCH format. More specifically, the number of OFDM symbols mapped to the PDCCH is reported using the PCFICH. In the LTE, the number of OFDM symbols mapped to the PDCCH is 1, 2 or 3, the mapping being performed in order from a beginning OFDM symbol of a sub-frame.

The PHICH includes acknowledgement/non-acknowledgement information (ACK/NACK), which indicates whether retransmission is needed for the PUSCH transmitted in uplink. The PHICH, which indicates correct/not correct for each transmission unit such as a packet, may basically be represented in one bit. Therefore, it is not advantageous for radio transmission as it is. Therefore, PHICHs of a number of people are collected to construct information sets of multiple bits, the information undergoing multiplexing and spreading using code multiplexing and then being wirelessly transmitted.

For definition of terms, the PDCCH, PCFICH and PHICH may be defined as respectively independent channels in a downlink signal as described above, or the PDCCH may be defined to include the PCFICH and PHICH.

In uplink, user data (a normal data signal) and accompanying control information are transmitted using the PUSCH. Moreover, separately from the PUSCH, downlink quality information (CQI; channel quality indicator) and PDSCH acknowledgement/non-acknowledgement information (ACK/NACK), etc., are transmitted using the physical uplink control channel (PUCCH). The CQI is used for downlink shared physical channel scheduling process, adaptive modulation and coding scheme (AMCS), etc. In uplink, a random access channel (RACH) and a signal which indicates a request for allocating uplink and downlink radio resources, etc., is also transmitted as needed.

As shown in FIG. 1, the above-described acknowledgement information is transmitted a certain time period after receiving a data channel. In the illustrated example, the downlink data channel (DL data) is received at the user apparatus and is determined to be ACK or NACK, and the determined result is transmitted in uplink. It is desirable that acknowledgement information, which greatly affects throughput of data transmission, is transmitted accurately. From such a viewpoint, it is being proposed to repeatedly transmit acknowledgement information when communications conditions are not good.

FIG. 2 shows how a downlink data channel is received at a user apparatus and ACK or NACK is transmitted repeatedly (twice) in uplink. Such a repetition as described above is disclosed in Non-patent document 3.

Non-patent document 1:
3GPP TR 25.814 (V7.0.0), "Physical Layer Aspects for Evolved UTRA," June 2006

Non-patent document 2:
3GP R1-070103, Downlink L1/L2 Control Signaling Channel Structure Coding", Jan. 15-19, 2007

Non-patent document 3:
3GPP, R1-081950, "Necessity of ACK/NAK Repetition in PUCCH", May 5-9, 2008.

SUMMARY OF THE INVENTION

Problem(s) to be Solved by the Invention

FIG. 3 is a diagram for explaining a problem for repeatedly transmitting acknowledgement information. Suppose first and second downlink data channels are successively transmitted. According to the above repetition scheme, acknowledgement information must be transmitted (over 2 TTIs) in first and second uplink transmission periods in the first downlink data channel and acknowledgement information must also be transmitted (over 2 TTIs) in second and third uplink transmission periods in the second downlink data channel. In this case, in the second uplink transmission period, there is a concern that acknowledgement information of the first downlink data channel and acknowledgement information of the second downlink data channel collide, leading to not being able to transmit properly.

In order to avoid this, it is possible to transmit acknowledgement information of the second downlink data channel in third and fourth uplink transmission periods after acknowledgement information of the first downlink data channel is completely transmitted in the first and second uplink transmission periods. In this way, there arises a problem that, while it becomes possible to properly transmit the first and the second acknowledgement information without collision, a longer time may be needed before all acknowledgement information sets are transmitted.

Alternatively, it is possible to put a constraint on scheduling such that a downlink data channel is not successively allocated to a user which repeatedly transmits acknowledgement information. In this way, the above concern for collision may be overcome. However, putting such a constraint on scheduling prevents effective utilization of frequency resources while it adds a further processing burden on the scheduling. In other words, it is not desirable as there is a possibility that downlink data throughput to a cell-edge user may decrease.

The problem to be solved by the present invention is to make it possible to properly transmit acknowledgement information without delay even when downlink data channels are successively received when acknowledgement information must be transmitted multiple times for each downlink data channel.

Means for Solving the Problem

A communications apparatus for use in an embodiment of the present invention includes: a receiving unit which receives a data channel for each predetermined transmission period; a determining unit which determines, for each data channel, acknowledgement information which indicates an acknowledgement or a non-acknowledgement; a generating unit which generates a control channel including the acknowledgement information; and a transmitting unit which transmits the control channel. For first and second data channels received by the receiving unit during at least successive first and second transmission periods, first and second acknowledgement information sets are provided. A second control channel which includes both the first and the second acknowledgement information is transmitted after a first control channel which includes the first acknowledgement information is transmitted.

A communications apparatus for use in another embodiment of the present invention includes: a receiving unit which receives a control channel for each transmission period; a unit which obtains, from each control channel, acknowledgement information which indicates acknowledgement or non-acknowledgement; and a unit which performs retransmission control depending on whether the acknowledgement information indicates acknowledgement. A second control channel which includes both first and second acknowledgement information is received after a first control channel which includes the first acknowledgement information is received. The first and second acknowledgement information sets respectively represent acknowledgement information for first and second data channels. The first and second data channels have been transmitted during at least successive first and second transmission periods.

In a further embodiment of the present invention, a mobile communications system is used having a user apparatus and a base station apparatus. The user apparatus includes a receiving unit which receives a data channel for each predetermined transmission period, a determining unit which determines, for each data channel, acknowledgement information which indicates an acknowledgement or a non-acknowledgement, a generating unit which generates a control channel including the acknowledgement information, and a transmitting unit which transmits the control channel. The base station apparatus includes a receiving unit which receives a control channel for each transmission period; a unit which obtains, from each control channel, acknowledgement information which indicates acknowledgement or non-acknowledgement; and a unit which performs retransmission control depending on whether the acknowledgement information indicates acknowledgement. For first and second data channels received during at least successive first and second transmission periods, first and second acknowledgement information sets are provided. A second control channel is transmitted from the user apparatus to the base station apparatus after a first control channel which includes the first acknowledgement information is transmitted from the user apparatus to the base station apparatus.

ADVANTAGE OF THE INVENTION

According to one embodiment of the present invention, it is made possible to properly transmit acknowledgement information without delay even when downlink data channels are successively received when acknowledgement information must be transmitted multiple times for each downlink data channel.

DESCRIPTION OF THE PREFERRED EMBODIMENTS

[Description of Notations]

Figure 1:
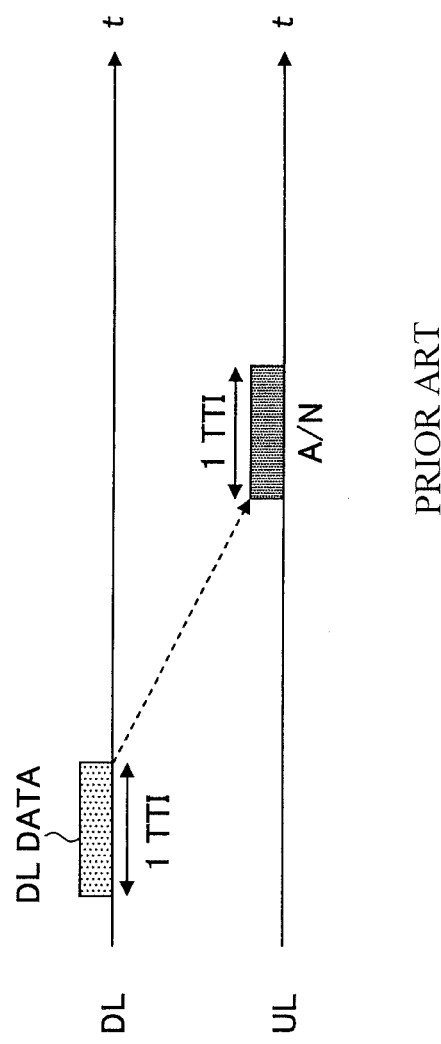
FIG. 1 is a diagram illustrating how A/N is transmitted to a downlink data channel after a certain period.
Figure 2:
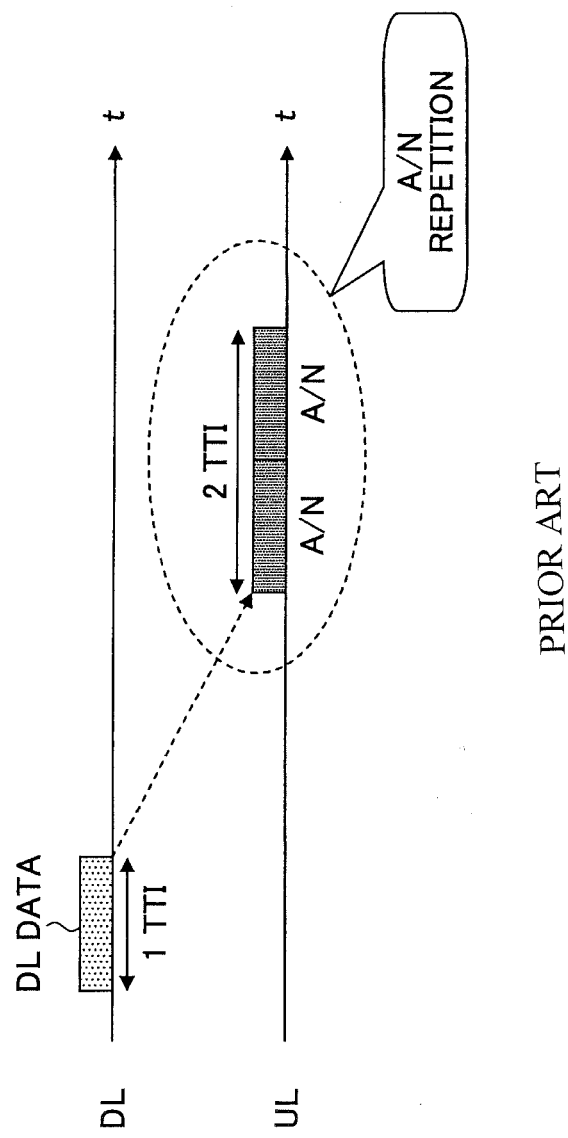
FIG. 2 is a diagram illustrating how A/N is transmitted repeatedly.
Figure 3:
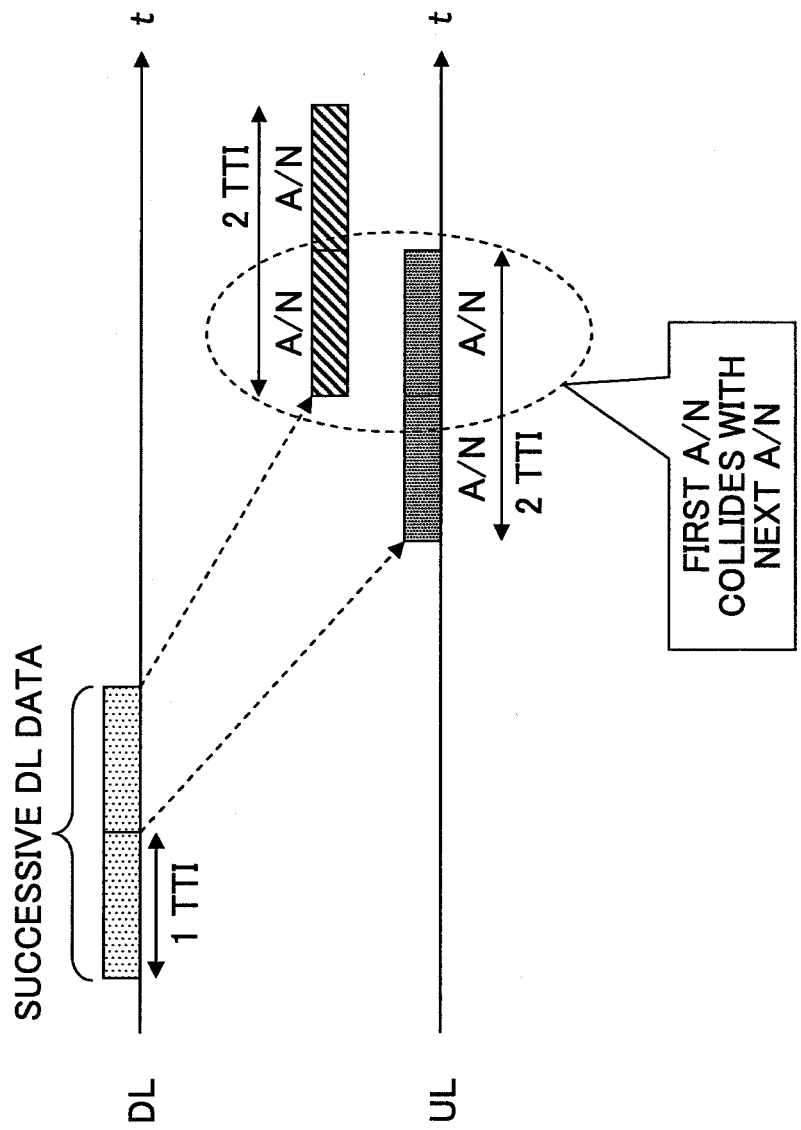
FIG. 3 is a diagram for explaining a problem.

50 cell; $100_1$, $100_2$, $100_3$ user apparatus; 200 base station apparatus; 300 upper-layer node; 400 core network; 101 A/N information generator; 102 repetition information generating and data modulating unit; 103 uplink control signal generator; 104 transmitter; 111 receiver; 112 channel compensating unit; 113 repetition information extracting and data demodulating unit; 114 A/N determining unit

BEST MODE OF CARRYING OUT THE INVENTION

According to one embodiment of the present invention, for first and second data channels received in successive first and second transmission periods, first and second acknowledgement information sets (A/N-1, A/N-2) are respectively provided. Then, after a first control channel (PUCCH-1) including first acknowledgement information (A/N-1) is transmitted, a second control channel (PUCCH-2) including first and second transmission acknowledgement information (A/N-1, A/N-2) is transmitted. After the first control channel is transmitted, the second control channel including the first and the second acknowledgement information is transmitted, so that the acknowledgement information is properly transmitted without delay.

The first acknowledgement information (A/N-1) may be reflected in an I component (or a Q component) in the first control channel (PUCCH-1), while it may be reflected in the Q component (or the I component) in the second control channel (PUCCH-2). Using a quadrature modulation scheme makes it possible to distinguish the first and second acknowledgement information. This is preferable in being able to properly transmit acknowledgement information without delay as well as to easily check whether the acknowledgement information is an initial one or a repeated one and to accurately determine at a base station which one of the first and second data channels the acknowledgement information is intended for.

The second acknowledgement information (A/N-2) may be reflected in the I component (or the Q component) in the second control channel (PUCCH-2), while it may be reflected in the Q component (or the I component) in a third control channel (PUCCH-3), which follows the second control channel. In the first control channel, the first acknowledgement information is data modulated with a data modulation scheme having a certain multi-value number, while, in the second control channel, the first and second acknowledgement information sets are data modulated with a data modulation scheme having a multi-value number greater than the above-described multi-value number. For example, the first acknowledgement information may be data modulated with a BPSK scheme in the first control channel, while the first and second acknowledgement information may be data modulated with a QPSK scheme in the second control channel. Moreover, the first acknowledgement information may be data modulated with the QPSK scheme in the first control channel, while the first and second acknowledgement information may be data modulated with a 16 QAM scheme in the second control channel. A higher-order modulation scheme may also be used. In this way, the first and second acknowledgement information may be efficiently multiplexed in the second control channel.

The second control channel (PUCCH-2) may include the first and second acknowledgement information in a time division multiplexing scheme. This method is preferable in not depending on a data modulation scheme for the first and second acknowledgement information.

The first acknowledgement information (A/N-1) may be reflected in the I component (or the Q component) in the first control channel (PUCCH-1), while it may be reflected in the Q component (or the I component) in the second control channel (PUCCH-2). Then, the second acknowledgement information (A/N-2) may be reflected in the I component in the second control channel (PUCCH-2), while it may be reflected in the Q component in the third control channel (PUCCH-3), which follows the second control channel. Moreover, the second control channel may include the first and second acknowledgement information in the time division multiplexing scheme. Combining the above-described features is preferable in being able to reliably determine that the acknowledgement information has been transmitted to the first data channel or the second data channel.

For convenience of explanations, the embodiments of the present invention are explained by breaking them down into a number of items. However, such a breakdown is not essential to the present invention, so that matters separately recited in two or more items may be combined for use, as needed. While specific numerical value examples are used to facilitate understanding of the present invention, such numerical values are merely examples, so that any appropriate value may be used unless specified otherwise.

Embodiments of the present invention are described from the following points of view:

A. System
B. Operational flow
C. Transmission scheme—part 1
D. Transmission scheme—part 2
E. Transmission scheme—part 3
F. Transmission scheme—part 4
G. User apparatus
H. Base station apparatus Embodiment 1

A. System

Figure 4:
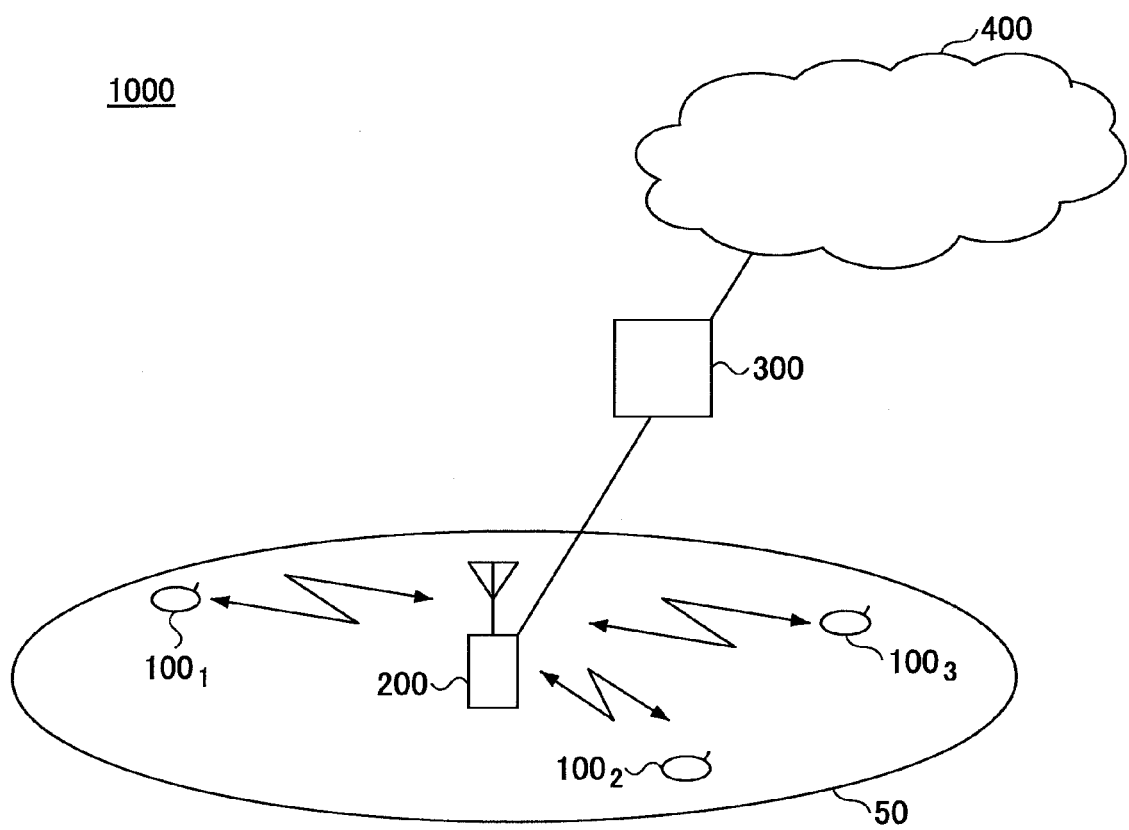
FIG. 4 is a conceptual diagram of a mobile communications system.

FIG. 4 is a conceptual diagram of a mobile communications system. The mobile communications system includes a cell (50), user apparatuses (user equipment (UE) units) ($100_1$, $100_2$, $100_3$), which reside within the cell (50), a base station apparatus (200), which wirelessly communicates with the user apparatuses, an upper-level node (300), which is connected to the base station apparatus, and a core network (400), which is connected to the upper-level node. The upper-level node (300) may be, for example, a radio network controller (RNC), an access gateway (aGW), a mobility management entity (MME), etc. In the mobile communications system, for uplink/downlink, a multi-carrier scheme may be used, or a single-carrier scheme may be used. Any appropriate multi-carrier scheme may be used, but, as an example, an OFDM scheme or a DFT-spread OFDM scheme may be used. In a mobile communications system, the multi-carrier scheme may be used all the time, or the single-carrier and multi-carrier schemes may be used together. For example, in a region in which radio propagation condition is good, such as in a vicinity of a base station, the OFDM scheme may be used, while in a region in which radio propagation condition is not good, such as at a cell edge, a single-carrier (an SC-FDMA) scheme may be used.

B. Operational Flow

Figure 5:
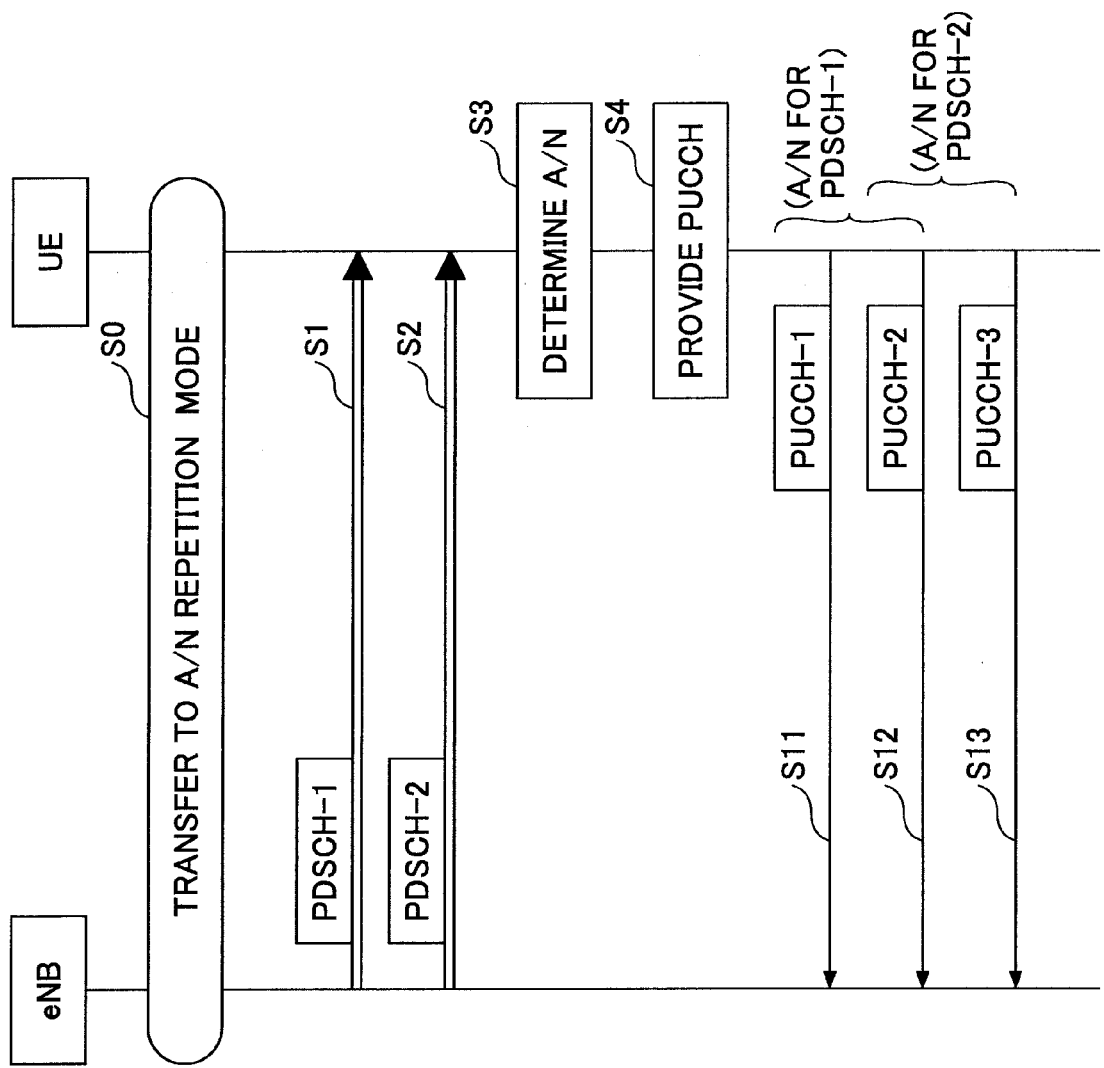
FIG. 5 is a diagram illustrating an exemplary operation according to an embodiment of the present invention.

FIG. 5 shows an exemplary operation according to an embodiment of the present invention. In step S0, a procedure is performed such that a user apparatus (UE) transfers to an operating mode (called a repetition mode) for repeatedly transmitting acknowledgement information. For example, abase station (eNB) monitors a communications condition of each user apparatus and transfers, to a repetition mode, an operating mode of a user apparatus such that communications condition is not good.

In step S1, the downlink data channel (PDCSH-1) is transmitted to the user apparatus.

In step S2, the downlink data channel (PDCSH-2) is transmitted to the same user apparatus as in step S1. These two downlink data channels are successively transmitted. More specifically, a sub-frame which includes a downlink data channel (PDSCH-1) is followed by a sub-frame which includes the following downlink data channel (PDSCH-2). In the base station, processes such as scheduling, etc., are performed before steps S1 and S2. However, these are omitted for brevity of illustration.

In step S3, the user apparatus performs error detection for a received downlink data channel, and provides acknowledgement or non-acknowledgement information (ACK/NACK) for each data channel. In the illustrated example, first acknowledgement information (A/N-1) for the first data channel (PUSCH-1) and second acknowledgement information (A/N-2) for the second downlink data channel (PUSCH-2) are provided. For convenience of explanations, two downlink data channels are successively transmitted, but three or more downlink data channels may be successively transmitted. In either way, acknowledgement information is provided for each downlink data channel.

In step S4, uplink control signals (PUCCH) including acknowledgement information are provided. Three uplink control signals are provided, which are represented for convenience as PUCCH-1, PUCCH-2, and PUCCH-3.

In steps S11, S12, and S13, these three uplink control signals (PUCCH-1, 2, 3) are transmitted in order. A period between steps S1 to S11 and a period between S2 to S12 are approximately 4 TTIs, for example.

A first uplink control channel (PUCCH-1) includes the first acknowledgement information (A/N-1), but does not include the second acknowledgement information (A/N-2).

A second uplink control channel (PUCCH-2) includes both the first acknowledgement information (A/N-1) and second acknowledgement information (A/N-2). These are multiplexed in a scheme to be described later.

A third uplink control channel (PUCCH-3) does not include the first acknowledgement information (A/N-1), but includes the second acknowledgement information (A/N-2).

Of the first through the third uplink control channels, the feature of the second uplink control channel may be arranged to be different from that of the other control channels to properly transmit the first and second acknowledgement information (A/N-1, A/N-2) without delay.

While it is illustrated such that steps S3 and S4 are successively performed after receiving two downlink data channels (PDSCH), this is not essential to the present invention. A series of procedures for receiving a downlink data channel (PDSCH), determining acknowledgement information, and providing PUCCH may be repeated for each downlink data channel (PDSCH). The second downlink control channel (PUCCH-2) not only includes first acknowledgement information but also second acknowledgement information, so that when it is provided, the first and second acknowledgement information (A/N-1, A/N-2) need to be provided already.

When acknowledgement information for the downlink data channel (PDSCH) is transmitted, if permission is provided to transmit the uplink data channel (PUSCH), the above-described acknowledgement information may be transmitted in control information which accompanies the uplink data channel (PUSCH). When such a radio resource may be used, a problem of the collision of the acknowledgement information (A/N-1, A/N-2) itself may be avoided. However, it is not necessarily the case that such a radio resource can always be used. Thus, the present embodiment can be used even when a radio resource is not allocated for the uplink data channel.

Below, how first and second acknowledgement information sets (A/N-1, A/N-2) are transmitted in the first through third uplink control channels is explained.

C. Transmission Scheme—Part 1

Figure 6:
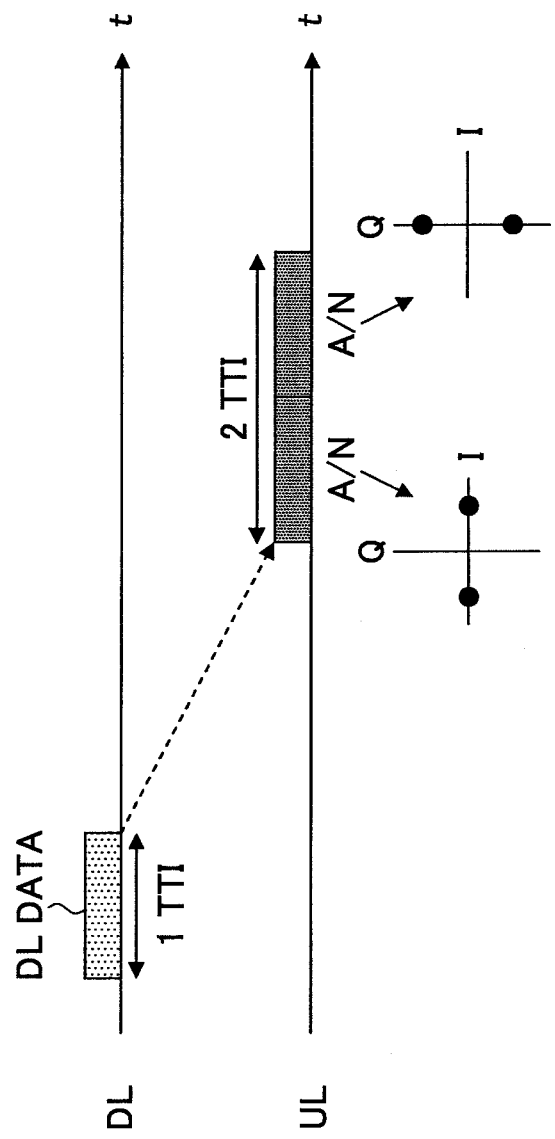
FIG. 6 is a principle diagram for explaining a transmission scheme of acknowledgement information.

FIG. 6 is a principle diagram for explaining a first part of a transmission scheme of acknowledgement information. Acknowledgement information (A/N-1) for a data channel first received at the user apparatus is reflected in an in-phase component (I) of a quadrature modulation scheme in a first uplink control channel and in an quadrature component (Q) of the quadrature modulation scheme in a second uplink control channel. The corresponding relationship between the acknowledgement information, and the in-phase and quadrature components may be reversed.

Figure 7:
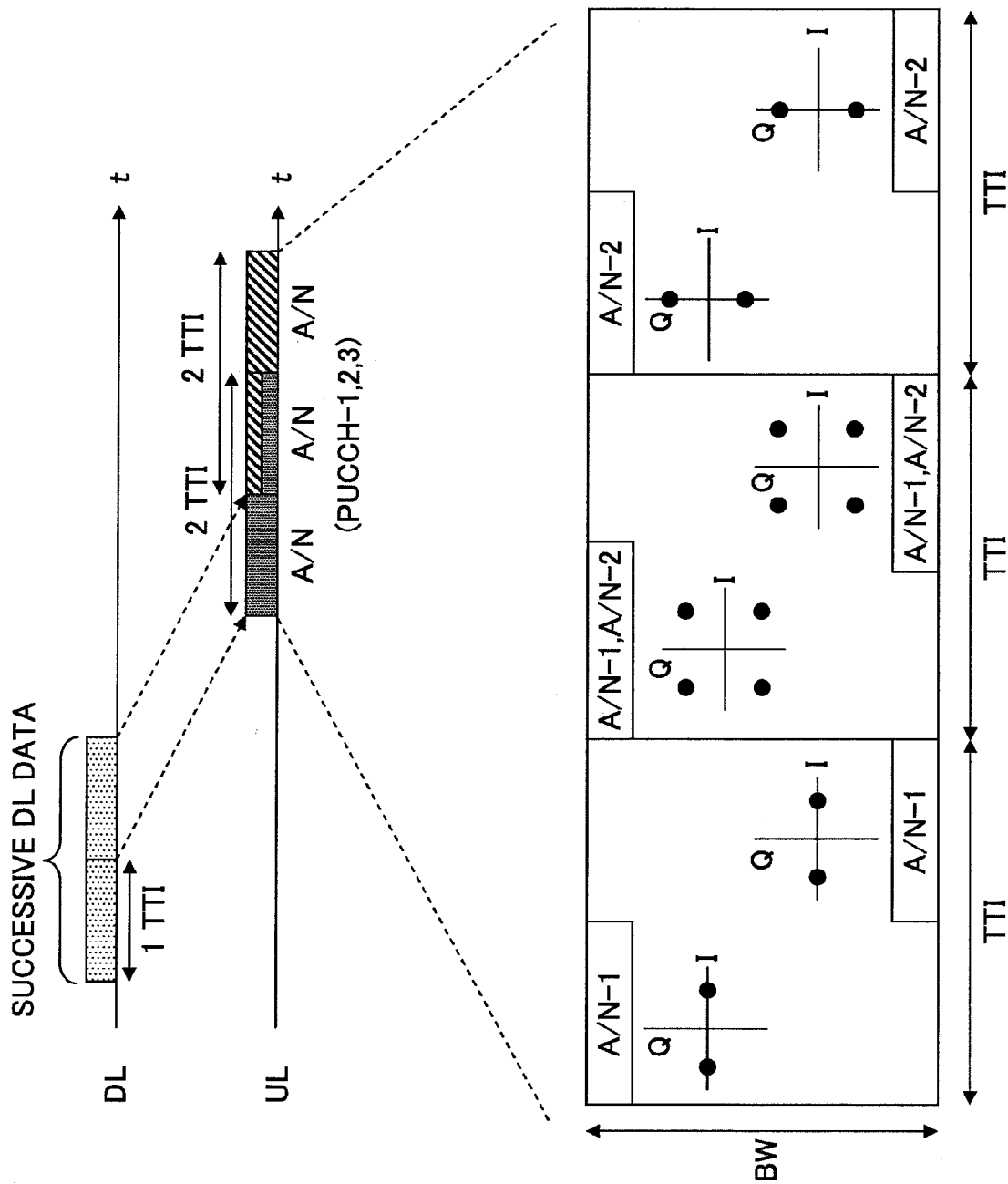
FIG. 7 is a diagram for explaining a first part of the transmission scheme of the acknowledgement information.

FIG. 7 shows how first and second acknowledgement information (A/N-1, A/N-2) is transmitted according to the principle in FIG. 6. A lower portion of FIG. 7 shows, from time and frequency viewpoints, first through third uplink control channels. As shown, BW represents system bandwidth.

In the first uplink control channel (PUCCH-1), of the first and second acknowledgement information (A/N-1, 2), the first acknowledgement information (A/N-1) is transmitted. According to the above-described principle, the first acknowledgement information is reflected to the in-phase component (I). More specifically, the first acknowledgement information (A/N-1) is data modulated in a bi-phase modulation (BPSK) scheme.

In the second control channel (PUCCH-2), both the first and second acknowledgement information sets (A/N-1, 2) are transmitted. According to the above-described principle, the first acknowledgement information (A/N-1) is reflected in the quadrature component (Q). The second acknowledgement information (A/N-2) is reflected in the in-phase component (I). More specifically, the first and second acknowledgement information (A/N-1, A/N-2) is data modulated in a four-phase modulation (QPSK) or a quadrature amplitude modulation (QAM) scheme. In other words, an I component of one signal point in a signal point constellation represents the second acknowledgement information (A/N-2), while a Q component represents the first acknowledgement information (A/N-1).

In the third control channel (PUCCH-3), of the first and second acknowledgement information (A/N-1, 2), the second acknowledgement information (A/N-2) is transmitted. According to the above-described principle, the second acknowledgement information is reflected in the quadrature component (Q). More specifically, the second acknowledgement information (A/N-2) is data modulated with the BPSK scheme.

According to the present method, in the second control channel (PUCCH-2), I and Q components of the quadrature modulation scheme may be utilized to properly transmit first and second acknowledgement information (A/N-1, A/N-2) without delay. Which of the I and Q components the acknowledgement information is reflected in may be checked to easily determine that it is transmitted the first time or the second time. This detects a discontinuous transmission period (DTX). In other words, in the base station, this is preferable from a point of view of being able to accurately determine which of the first and second data channels the acknowledgement information is for.

In the present embodiment the downlink data channel is successively transmitted twice, but it may be transmitted more than twice. When the acknowledgement information is transmitted repeatedly (twice), a series of first through fourth uplink control channels (PUCCH 1-4) is transmitted. The first uplink control channel includes acknowledgement information (A/N-1) which is data modulated with the BPSK scheme. The second and third uplink control channels include acknowledgement information (A/N-2, 3) which is data modulated with the QPSK scheme. The fourth uplink control channel includes acknowledgement information (A/N-4) which is data modulated with the BPSK scheme. Below, in a similar manner, a large number of downlink data channels may be successively transmitted. When the number of repetitions of the acknowledgement information is more than two, a data modulation scheme having a larger modulation multi-value number may be used to properly transmit each of the acknowledgement information sets without delay.

D. Transmission Scheme—part 2

Figure 8:
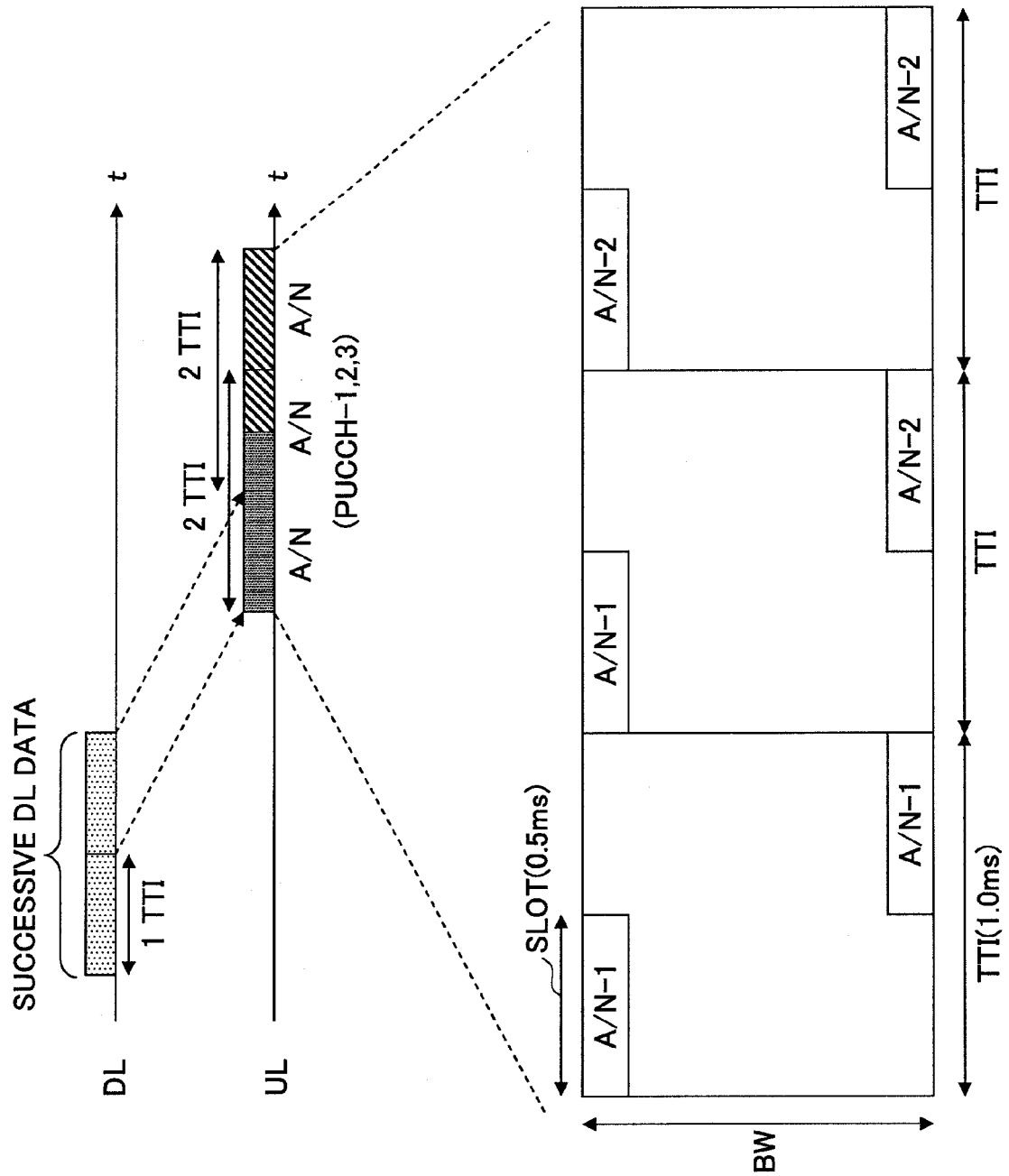
FIG. 8 is a diagram for explaining a second part of the transmission scheme of the acknowledgement information.

FIG. 8 is a principle diagram for explaining a second part of a transmission scheme of acknowledgement information. A lower portion of FIG. 8 shows, from time and frequency viewpoints, first through third uplink control channels. As shown, BW represents system bandwidth. An uplink control channel (PUCCH) is transmitted in a band secured for dedicated use on both sides of a system bandwidth. As shown, one sub-frame (TTI) includes two slots. Thus, different signals may be transmitted between a former-half slot and a latter-half slot. The present method uses this characteristic to configure the second control channel.

The first acknowledgement information (A/N-1) is transmitted using a former-half slot of the second uplink control channel and all the sub-frame of the first uplink control channel. The second acknowledgement information (A/N-2) is transmitted using a latter-half slot of the second uplink control channel and all the sub-frame of the third uplink control channel. In other words, the second uplink control channel transmits the first acknowledgement information (A/N-1) in a former-half slot and the second acknowledgement information (A/N-2) in a latter-half slot.

According to the present method, the first and second acknowledgement information (A/N-1, A/N-2) may be transmitted in a time-division multiplexing scheme to properly transmit each of the acknowledgement information sets without delay. The present method does not depend on the data modulation scheme of the acknowledgement information. Therefore, for example, it is not mandatory to increase the modulation multi-value number in the second uplink control channel (in the previously-described transmission scheme, the modulation multi-value number had to be increased from 2 to 4 in the second uplink control channel.) The present method is preferable in that, for example, in the first through third uplink control channels, the data modulation scheme of acknowledgement information may be made uniform as BPSK, which is easy and accurate.

E. Transmission Scheme—Part 3

Figure 9:
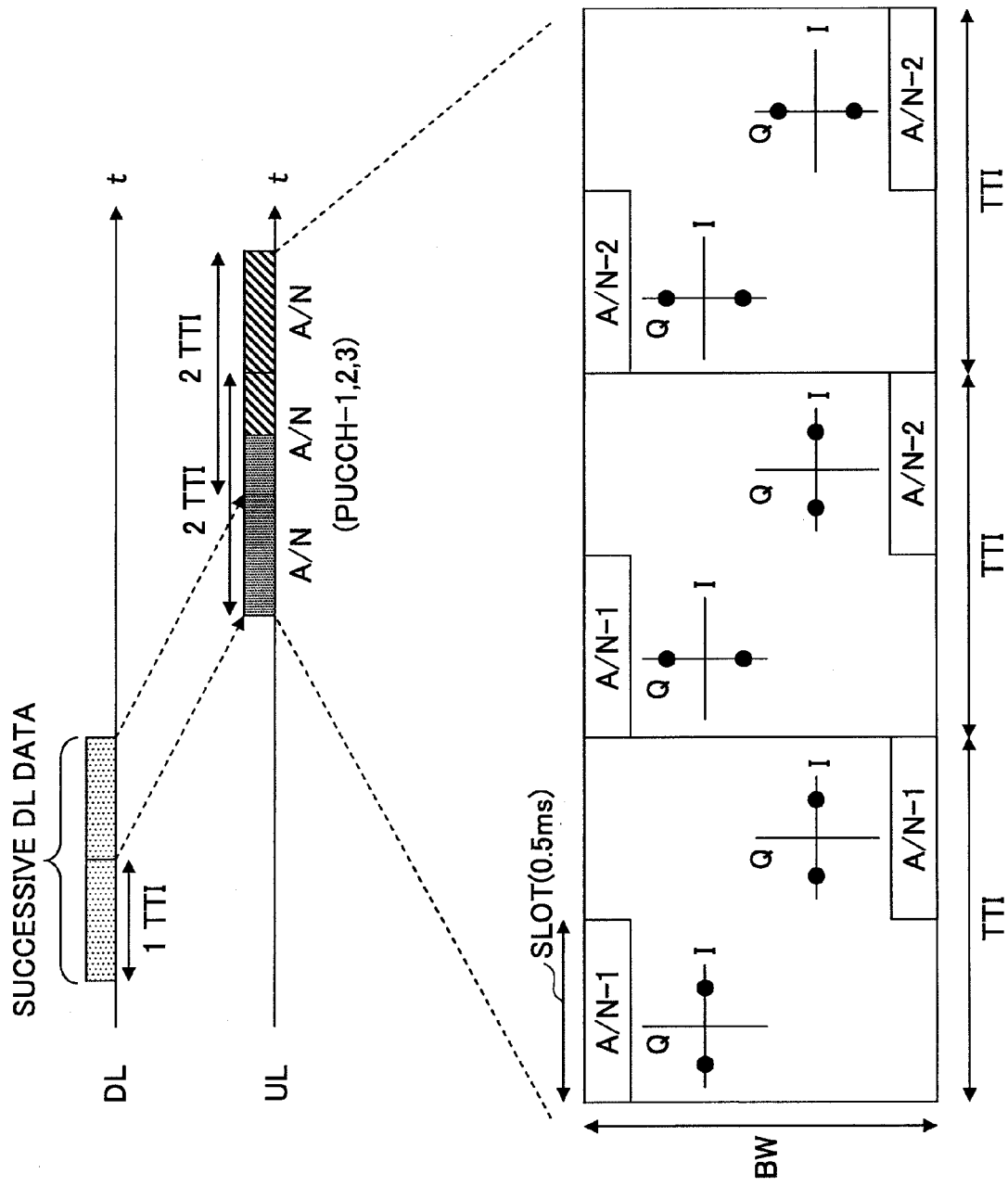
FIG. 9 is a diagram for explaining a third part of the transmission scheme of the acknowledgement information.

FIG. 9 is a diagram for explaining a third part of a transmission scheme of acknowledgement information. In general, the present method corresponds to a combination of a transmission scheme (part 1, FIG. 7) and a transmission scheme (part 2, FIG. 8). A lower portion of FIG. 9 shows, from time and frequency viewpoints, first through third uplink control channels. As shown, BW represents system bandwidth. An uplink control channel (PUCCH) is transmitted in a band secured for dedicated use on both sides of a system bandwidth.

The first acknowledgement information (A/N-1) is reflected in I component in the first control channel (PUCCH-1), and in Q component in the second uplink control channel (a former-half slot). The second acknowledgement information (A/N-2) is reflected in I component in the second control channel (a latter-half slot), and in Q component in the third uplink control channel (PUCCH-3).

According to the present method, which of the I and Q components the acknowledgement information is reflected to may be checked to easily determine that it is transmitted the first time or the second time. Moreover, for example, in the first through third uplink control channels, the data modulation scheme of acknowledgement information may be made uniform as BPSK, which is easy and reliable. Thus, according to the present method, there is a synergistic effect of being able to reliably determine that the acknowledgement information is transmitted for the first data channel or the second data channel.

F. Transmission Scheme—Part 4

According to the above-described transmission method (part 1), first acknowledgement information (A/N-1) is data modulated with the BPSK scheme in the first control channel (PUCCH-1), while the first and second acknowledgement information sets (A/N-1, A/N-2) are data modulated with the QPSK scheme in the second control channel (PUCCH-2). The present invention is not limited to such a data modulation, so that a higher-degree data modulation scheme may be used.

Figure 10:
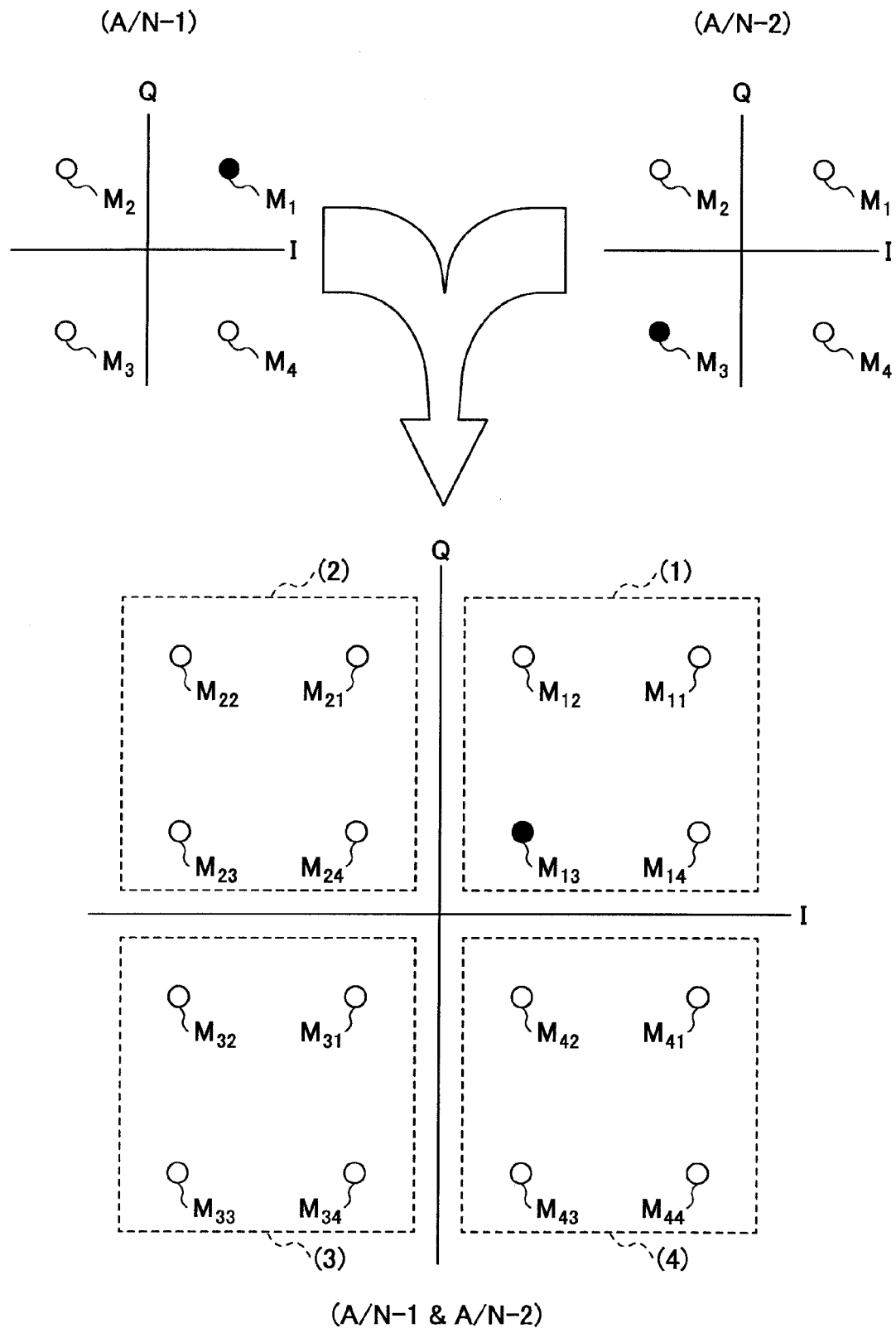
FIG. 10 is a diagram for explaining a fourth part of the transmission scheme of the acknowledgement information.

FIG. 10 is a diagram for explaining a fourth part of the transmission scheme of acknowledgement information. According to the present method, first acknowledgement information (A/N-1) is data modulated with the QPSK scheme in the first control channel (PUCCH-1), while the first and second acknowledgement information sets (A/N-1, A/N-2) are data modulated in the 16 QAM scheme in the second control channel (PUCCH-2). FIG. 10 indicates how the first and second acknowledgement information (A/N-1, A/N-2) is multiplexed in the second control channel (PUCCH-2). The first acknowledgement information (A/N-1) before multiplexing corresponds to any of signal points in the QPSK scheme. For convenience, there is arranged to be a correspondence to $M_1$, out of four signal points $M_1$-$M_4$, but generality is not necessarily lost. Similarly, the second acknowledgement information (A/N-2) before multiplexing also corresponds to any of signal points in the QPSK scheme. For convenience, there is arranged to be correspondence to $M_1$, out of four signal points $M_1$-$M_4$, but generality is not necessarily lost.

In a signal point constellation for a 16 QAM scheme, four quadrants are set as (1) to (4), and 16 signal points are called $M_{11}, M_{12}, \ldots, M_{44}$. The first acknowledgement information (A/N-1) is associated with any one quadrant of four quadrants. In the example shown, $M_1$ which represents the first acknowledgement information (A/N-1) is associated with the first quadrant (1). Of four signal points within the first quadrant (1), $M_3$, which is the second acknowledgement information (A/N-2) is associated with any one of the signal points. As a result, a signal point of $M_{13}$ in the 16 QAM scheme constellation represents the first and second acknowledgement information (A/N-1, A/N-2). Such a control channel is transmitted.

At the receiver, which quadrant the determined signal point belongs to and which signal point in the quadrant the determined signal point is may be specified to determine the first and second acknowledgement information (A/N-1, A/N-2). For the present example, the signal point $M_{13}$ belongs to the first quadrant (1), so it can be seen that the first acknowledgement information (A/N-1) corresponds to a signal point $M_1$ in the QPSK scheme. Moreover, of four signal points $M_{11}, M_{12}, M_{13},$ and $M_{14}$ in the first quadrant (1), the signal point is $M_{13}$, so it can be seen that the second acknowledgement information (A/N-2) corresponds to a signal point $M_3$ in the QPSK scheme.

The second acknowledgement information (A/N-2) may be associated with the quadrant, and the first acknowledgement information (A/N-1) may be associated with a signal point in the quadrant.

According to the present method, the first or second acknowledgement information (A/N-1, A/N-2) is data modulated with a QPSK scheme, making it possible to transmit more information than in a case of data modulating with a BPSK scheme. The present method may also be combined for use with a time-division multiplexing scheme such as the above-described transmission scheme (part 2).

G. User Apparatus

Figure 11:
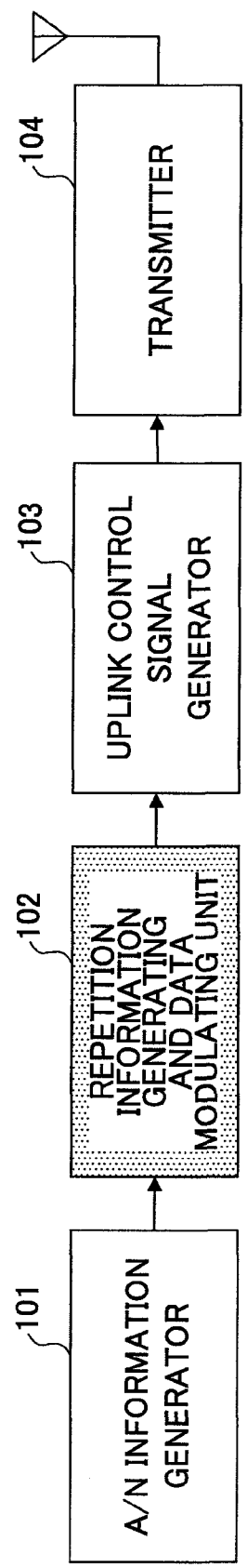
FIG. 11 is a functional block diagram of a user apparatus according to an embodiment of the present invention.

FIG. 11 is a functional block diagram of a user apparatus according to an embodiment of the present invention. FIG. 11 shows an A/N information generator (101), a repetition information generating and data modulating unit (102), an uplink control signal generator (103), and a transmitter (104).

The A/N information generator (101) provides acknowledgement information for a data channel (PDSCH), which is received in downlink. The downlink data channel is transmitted for each predetermined transmission period (TTI). The acknowledgement information is provided for each downlink data channel transmitted for an own apparatus. The acknowledgement information is expressed as acknowledgement (ACK) or non-acknowledgement (NACK).

The repetition information generating and data modulating unit (102) is used in a case such that acknowledgement information must be transmitted multiple time (typically twice) for each downlink data channel. Whether there is a need for the user apparatus to transmit acknowledgement information multiple times is reported from the base station apparatus as needed. The repetition information generating and data modulating unit (102) provides control information to be transmitted repeatedly according to any of the above-described transmission schemes (1, 2, or 3). Moreover, the repetition information generating and data modulating unit (102) also performs data modulation of the acknowledgement information according to the above-described transmission scheme. This data modulation is BPSK or QPSK (or QAM).

The uplink control signal generator (103) includes, in the uplink control channel (PUCCH), repetition information provided at the repetition information and data modulating unit (102).

The transmitter (104) wirelessly transmits the generated uplink control channel (PUCCH).

H. Base Station Apparatus

Figure 12:
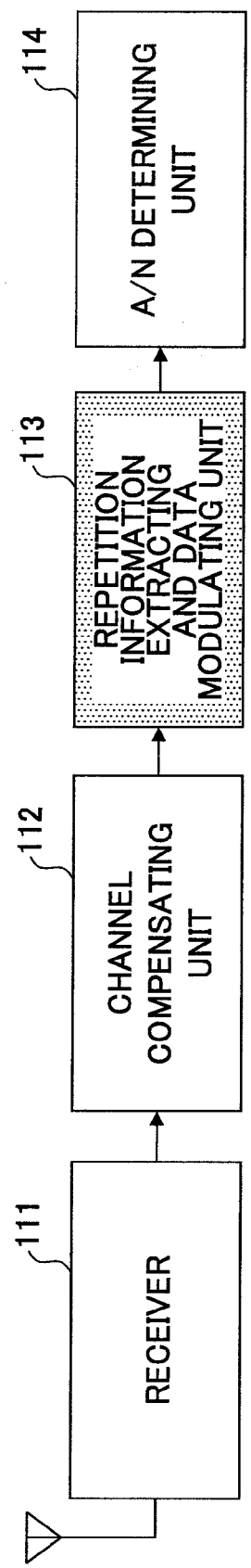
FIG. 12 is a functional block diagram of a base station apparatus according to an embodiment of the present invention.

FIG. 12 is a functional block diagram of a base station apparatus according to an embodiment of the present invention. FIG. 12 shows a receiver (111), a channel compensating unit (112), a repetition information extracting and data demodulating unit (113), and an A/N determining unit (114).

The receiver (111) receives a signal transmitted in uplink. In the present embodiment, an uplink control channel is received, in particular.

The channel compensating unit (112) performs channel compensation based on a received condition of a received pilot channel. When the uplink control channel is transmitted, a pilot channel is transmitted at two timings for each slot, for example. This pilot channel may be used to perform channel estimation.

In the repetition information extracting and data demodulating unit (113), repetition information is extracted from a received uplink control channel and data demodulation is performed. The repetition information is information provided at a user apparatus (repetition information generating and data modulating unit (102) in FIG. 10) according to any of the above-described transmission schemes (1, 2, 3).

Based on the data-demodulated repetition information, the A/N determining unit (114) determines whether acknowledgement information for the downlink data channel transmitted by an own apparatus (base station) in the past is positive acknowledgement or non-acknowledgement. Retransmission control is performed according to the determined result. The retransmission control is generally performed with a hybrid automatic retransmission request (HARQ) scheme.

The present invention is not limited to the above embodiments, so that it may be applied to any appropriate system which repeatedly transmits acknowledgement information. For example, the present invention may be applied to HSDPA/HSUPA W-CDMA, LTE, IMT-advanced, WiMAX, Wi-Fi systems, etc.

As described above, while the present invention is described with reference to specific embodiments, the respective embodiments are merely exemplary, so that a skilled person will understand variations, modifications, alternatives, replacements, etc. While specific numerical value examples are used to facilitate understanding of the invention, such numerical values are merely examples, so that any appropriate value may be used unless specified otherwise. For example, successive transmission of a data channel maybe performed not only twice, but also more than twice. Moreover, the number of times of repeatedly transmitting acknowledgement may be more than two. Furthermore, it is not mandatory that acknowledgement information transmitted the first time and acknowledgement information transmitted the second time are always processed equivalently. Possibly, acknowledgement information which arrived at the base station earlier (the first information) may be processed preferentially relative to the latter. Alternatively, the latter may conversely be processed preferentially relative to the former. Moreover, in the present embodiment, for achieving brevity of explanation, a condition has been explained of transmitting acknowledgement information in an uplink control channel. However, with respect to the present invention, the distinction of uplink and downlink is not mandatory. The present invention may be applied when acknowledgement information is transmitted in a downlink control channel. At any rate, the present invention may be applied to any appropriate condition such that acknowledgement information is transmitted multiple times for the received data channel.

The breakdown of items in the above embodiment is not essential to the present invention, so that matters described in two or more items may be combined for use as needed. For convenience of explanation, while the apparatuses according to the embodiments of the present invention are explained using functional block diagrams, such apparatuses as described above may be implemented in hardware, software, or a combination thereof. The present invention is not limited to the above embodiments, so that variations, modifications, alternatives, and replacements are included in the present invention without departing from the spirit of the present invention.

The present international application claims priority based on Japanese Patent Application No. 2008-163845 filed on Jun. 23, 2008, the entire contents of which are hereby incorporated by reference.

The invention clamed is:

1. A communications apparatus, comprising:
a receiving unit which receives a data channel for each predetermined transmission period;
a determining unit which determines, for each data channel, acknowledgement information which indicates an acknowledgement or a non-acknowledgement;
a generating unit which generates a control channel including the acknowledgement information; and
a transmitting unit which transmits the control channel, wherein, for first and second data channels received by the receiving unit during at least successive first and second transmission periods, the determining unit provides first and second acknowledgement information, and wherein
the transmitting unit is arranged to transmit a second control channel which includes both the first and the second acknowledgement information immediately after transmitting a first control channel which includes the first acknowledgement information.

2. The communications apparatus as claimed in claim 1, wherein the first acknowledgement information is arranged to be reflected in one of an in-phase component and a quadrature component of a quadrature modulation scheme in the first control channel, and in the other of the in-phase component and the quadrature component in the second control channel.

3. The communications apparatus as claimed in claim 2, wherein the second acknowledgement information is arranged to be reflected in the one in the second control channel, and in the other in the third control channel which follows the second control channel.

4. The communications apparatus as claimed in claim 1, wherein the first acknowledgement information is data modulated with a data modulation scheme having a certain multi-value number in the first control channel, and wherein the first acknowledgement information and the second acknowledgement information are data modulated with a data modulation scheme having a multi-value number which is larger than the certain multi-value number.

5. The communications apparatus as claimed in claim 4, wherein the first acknowledgement information is data modulated with a BPSK scheme in the first control channel, and wherein
the first acknowledgement information and the second acknowledgement information are data modulated with a QPSK scheme in the second control channel.

6. The communications apparatus as claimed in claim 4, wherein the first acknowledgement information is data modulated with a QPSK scheme in the first control channel, and wherein
the first acknowledgement information and the second acknowledgement information are data modulated with a 16 QAM scheme in the second control channel.

7. The communications apparatus as claimed in claim 6, wherein, in the second control channel, the first acknowledgement information is associated with any one quadrant of four quadrants in a signal point constellation and the second acknowledgement information is associated with any one signal point of four signal points in the quadrant with which the first acknowledgement information is associated.

8. The communications apparatus as claimed in claim 1, wherein the second control channel is arranged to include the first acknowledgement information and the second acknowledgment information with a time-division multiplexing scheme.

9. The communications apparatus as claimed in claim 1, wherein the first acknowledgement information is arranged to be reflected in one of an in-phase component and a quadrature component of a quadrature modulation scheme in the first control channel, and in the other of the in-phase component and the quadrature component in the second control channel, wherein
the second acknowledgement information is arranged to be reflected in the one in the second control channel, and in the other in the third control channel which follows the second control channel, and wherein
the second control channel is arranged to include the first acknowledgement information and the second acknowledgment information with a time-division multiplexing scheme.

10. A communications method, comprising the steps of:
receiving a data channel for each predetermined transmission period;
determining, for each data channel, acknowledgement information which indicates an acknowledgement or a non-acknowledgement;
generating a control channel including the acknowledgement information; and
transmitting the control channel, wherein,
for first and second data channels received during at least successive first and second transmission periods, first acknowledgement information and second acknowledgement information are provided, and wherein
a second control channel is arranged to be transmitted immediately after transmitting a first control channel which includes the first acknowledgement information, which second control channel includes both the first and the second acknowledgement information.

11. A communications apparatus, comprising:
a receiving unit which receives a control channel for each transmission period;

a unit which obtains, from each control channel, acknowledgement information which indicates acknowledgement or non-acknowledgement;

a unit which performs retransmission control depending on whether the acknowledgement information indicates acknowledgement, wherein the receiving unit receives a second control channel which includes both first and second acknowledgement information immediately after receiving a first control channel which includes the first acknowledgement information, wherein the first and second acknowledgement information represent acknowledgement information for first and second data channels, and wherein the first and second data channels have been transmitted during at least successive first and second transmission periods.

12. The communications apparatus as claimed in claim 11, wherein the first acknowledgement information is arranged to be reflected in one of an in-phase component and a quadrature component of a quadrature modulation scheme in the first control channel, and in the other of the in-phase component and the quadrature component in the second control channel.

13. The communications apparatus as claimed in claim 12, wherein the second acknowledgement information is arranged to be reflected in the one in the second control channel, and in the other in the third control channel which follows the second control channel.

14. The communications apparatus as claimed in claim 11, wherein the first acknowledgement information included in the first control channel is demodulated with a data demodulation scheme having a certain multi-value number, and wherein the first acknowledgement information and second acknowledgement information included in the second control channel are demodulated with a data demodulation scheme having a multi-value number higher than the certain multi-value number.

15. The communications apparatus as claimed in claim 14, wherein the first acknowledgement information included in the first control channel is data demodulated with a BPSK scheme, and wherein the first acknowledgement information and second acknowledgement information included in the second control channel are data demodulated with a QPSK scheme.

16. The communications apparatus as claimed in claim 14, wherein the first acknowledgement information is data modulated with a QPSK scheme in the first control channel, and wherein the first acknowledgement information and the second acknowledgement information are data modulated with a 16 QAM scheme in the second control channel.

17. The communications apparatus as claimed in claim 16, wherein, in the second control channel, the first acknowledgement information is associated with any one quadrant of four quadrants in a signal point constellation and the second acknowledgement information is associated with any one signal point of four signal points in the quadrant with which the first acknowledgement information is associated.

18. The communications apparatus as claimed in claim 11, wherein the second control channel includes the first and second acknowledgement information with a time division multiplexing scheme.

19. The communications apparatus as claimed in claim 11, wherein the first acknowledgement information is arranged to be reflected in one of an in-phase component and a quadrature component of a quadrature modulation scheme in the first control channel, and in the other of the in-phase component and the quadrature component in the second control channel, wherein the second acknowledgement information is arranged to be reflected in the one in the second control channel, and in the other in the third control channel which follows the second control channel, and wherein the second control channel is arranged to include the first acknowledgement information and the second acknowledgment information with a time-division multiplexing scheme.

20. A communications method, comprising the steps of:

receiving a control channel for each transmission period;

obtaining, from each control channel, acknowledgement information which indicates acknowledgement or non-acknowledgement; and performing retransmission control depending on whether the acknowledgement information indicates acknowledgement, wherein a second control channel is received immediately after receiving a first control channel which includes the first acknowledgement information, which second control channel includes both the first and the second acknowledgement information, wherein the first and second acknowledgement information represent acknowledgement information for the first and second data channels, and wherein the first and second data channels have been transmitted during at least successive first and second transmission periods.

21. A mobile communications system having a user apparatus and a base station apparatus, wherein the user apparatus includes a receiving unit which receives a data channel for each predetermined transmission period, a determining unit which determines, for each data channel, acknowledgement information which indicates an acknowledgement or a non-acknowledgement, a generating unit which generates a control channel including the acknowledgement information, and a transmitting unit which transmits the control channel, and wherein the base station apparatus includes a receiving unit which receives a control channel for each transmission period;

a unit which obtains, from each control channel, acknowledgement information which indicates acknowledgement or non-acknowledgement; and a unit which performs retransmission control depending on whether the acknowledgement information indicates acknowledgement, wherein the user apparatus is arranged to provide, for first and second data channels received during at least successive first and second transmission periods, first and second acknowledgement information, and wherein a second control channel is arranged to be transmitted from the user apparatus to the base station apparatus immediately after a first control channel which includes the first acknowledgement information is transmitted from the user apparatus to the base station apparatus, which second control channel includes both the first and the second acknowledgement information.

* * * * *